April 9, 1935. A. A. BREUER 1,997,039
HEAT BLOWER
Filed Nov. 24, 1933
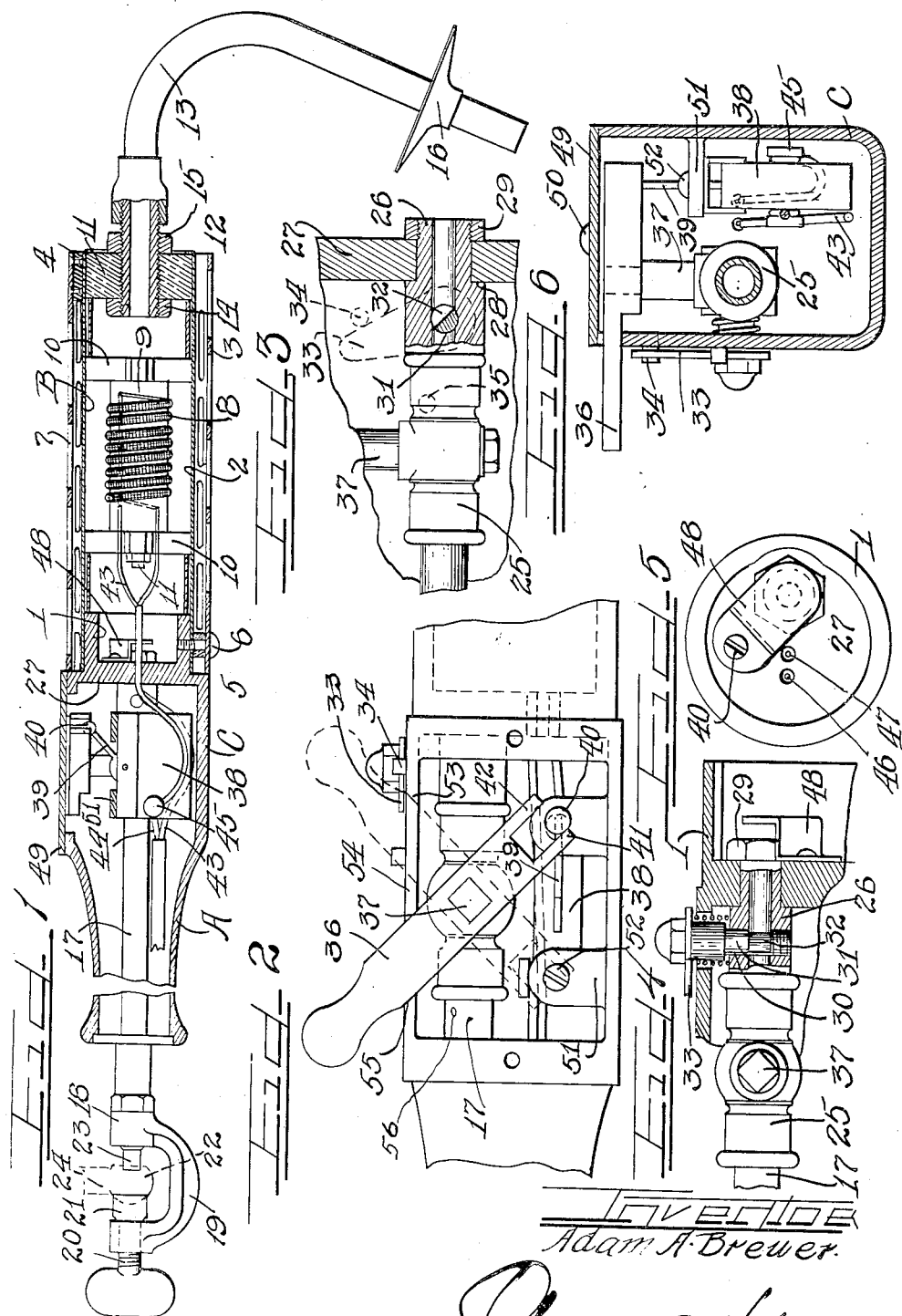
Inventor
Adam A. Breuer.

Patented Apr. 9, 1935

1,997,039

UNITED STATES PATENT OFFICE 1,997,039

HEAT BLOWER

Adam A. Breuer, Chicago, Ill.

Application November 24, 1933, Serial No. 699,481

2 Claims. (Cl. 219—39)

The present invention relates to heat blowers and more particularly to a hand operated blower for use in thawing or melting frozen or hardened material, and which is adapted for use in connection with an air pressure line.

The present invention is herein described with reference to a hand blower for melting grease in differential and transmission casings of automotive vehicles, although of course, it is adaptable for other needs.

An object of the present invention is to provide a readily portable hand manipulatable blower which may be used in connection with an air pressure line for liquefying or melting congealed materials, such as the lubricants of transmissions and differential casings of automobiles or for other purposes.

A further object of the invention is to provide a blower of the type herein described, wherein the air supply and heat supply are at all times under the control of the operator.

Another object of the invention is to provide a hand operable heat blower wherein the air and heat supply are simultaneously turned on or off, by a single instrumentality.

A further object of the invention is to provide a portable hand heat blower which is adaptable for connection to an air pressure line, and in which the air and heat supply are at all times within the control of the operator and which is provided with means for regulating the volume of air supplied.

A still further object of this invention is to provide a heat blower wherein the heat and air supply are at all times under the control of the operator, and wherein means are provided for preventing exclusion of air during heat supply.

The above, other and further objects of the invention will be apparent from the following description, the accompanying drawing, and the appended claims.

The accompanying drawing illustrates an embodiment of the present invention, and the views thereof are as follows:

Figure 1 is a view partially in longitudinal section, of a heat blower embodying principles of the present invention.

Figure 2 is a top plan view of a fragmental portion of the blower, showing the relationship of certain parts.

Figure 3 is an enlarged fragmental sectional view through a part of the air line.

Figure 4 is a fragmental sectional view of another part of the air supply line showing certain details of construction.

Figure 5 is an end elevational view of the inner end of the handle portion of the blower, where it is connected to the heating chamber.

Figure 6 is a cross sectional view through the control box of the illustrated form of the invention.

The drawing will now be explained.

A form of blower chosen to exemplify the present invention is illustrated as comprising a hollow handle A and a heating chamber designated generally as B. The handle and chamber are preferably arranged co-axially for convenience in use and for compactness of structure. The hollow handle A may be made of any suitable material, such for instance as aluminum, and at its inner end, that is the end which cooperates with the adjacent end of the heating chamber B is provided with a reduced annular flange 1 to which the heating chamber B is attached.

The heating chamber B is illustrated as consisting of a cylindrical shell 2 having about it a perforated guard 3 which is spaced from the shell by means of blocks 4 of insulating material at one end and spacer washers 5 surrounding securing screws 6 at the end adjacent the handle A. The part 3 is provided with a multiplicity of perforations 7 for heat radiation and at the same time provides a suitable handhold which does not become so hot as to be objectionable.

Heating chamber B is attached to the handle A by applying the inner end of the shell 2 over the annular shoulder 1 of the handle part and the screws or bolts 6 enter suitably threaded holes in this shoulder or flange.

Within the shell 2 is an electric heating element 8 illustrated as comprising a coil of wire mounted on a central support 9 of insulating material and which support in turn is carried by skeleton members 10 arranged at each end thereof and secured thereto by means of a central bolt 11 extending through the support 9 and passing through the end supports 10. The end supports 10 are made of heat resisting material and also insulating material. The outer end of the heat chamber B is closed by a plug 11 which is centrally apertured to receive a threaded nipple 12 to one end of which, the outer end, is attached a crook or nozzle 13. The nipple 12 is retained in the plug 11 by means of nuts 14 and 15 engaging the inside and outside respectively of the plug 11. The nozzle or crook 13 is threaded onto the extremity of the nipple outwardly of the plug 11. The nozzle 13 is shown as curved and provided with a guard 16 to limit penetration of the extremity of the nozzle into a crankcase or differential case or the like.

Extending through the hollow handle A is an air pipe 17 having secured to its outer end a clamp designated generally at 18 for receiving any standard air line valve, such as used at gasoline filling stations and the like for tire inflation. The clamp includes a yoke 19 having a bolt 20 threaded through one end thereof which bolt carries at its extremity a loosely mounted abutment for engaging against the head 22 of an air hose connection. The other end of the yoke is provided with a reduced connection 23 for entering the opening in the air valve 22 to admit air to the interior of the pipe 17. The air valve 22 is connected to the usual air hose 24 which in turn is connected to a suitable supply of compressed air.

A portion of the handle A is shown at C as being substantially rectangular in section. This particular portion may be termed a box in which are disposed the cock for regulating air passage and also the switch for regulating the supply of electrical current to the heating element 8 within the heating chamber B. The extremity of the pipe 17 which enters this section C is connected to a stop cock 25 and with the other branch of the cock connected to short pipe extension 26 which discharges into the heating chamber B and passes through the end wall 27 of the handle. This pipe extension is shown as provided with a shoulder 28 to abut the inner surface of the partition 27 and has its outer end reduced to receive a nut 29 for locking it in position. The pipe extension 26 is cross-bored at 30 to receive a volume control member herein illustrated as a cylindrical plug 31 and threaded in said bore, and having a portion of its body cut away at 32 to allow passage of air through the pipe section 26. The member 31 extends through a side of the portion B of the handle where it is provided with a lever 33 for rotating the member 31 about its axis within certain limits. Stops 34 and 35 are provided in the path of movement of the lever 33 to limit its movement in two directions. The stop 34 limits the movement in the direction to diminish air supply while the stop 31 limits the movement in the opposite direction, that is, limits the maximum amount of air supply. The parts are so arranged that when the lever 33 is against its stop 34 there is sufficient space to allow passage of a small amount of air into the heating chamber. This is done to prevent burning out of the heating element 8 in the event the air supply is reduced, and to prevent complete shutting off of air to the heating chamber while the heat is being supplied to said chamber.

The stop cock 25 is operated by means of a lever or handle 36 which is attached to the spindle 37 of the valve of said stop cock and which handle projects outwardly of the box C.

Within the section 3 of the hollow handle A is also provided a snap switch designated generally as 38, and in connection with which there is a snap lever 39 provided for opening and closing the switch. Snap lever 39 is provided with a ball head 40 which is arranged to lie within a bifurcation in the extremity of the lever 36 formed by providing ears 41 and 42.

Electrical conductors for supplying electricity to heating element 8 in the heating chamber B pass through the hollow handle and one of these, 43 is connected to one terminal of the heating coil 8 while the other conductor 44 is connected to a binding post 45 of the switch 38. A conductor leads from the switch 38 to the other terminal of the heating element 8.

The end 27 of the handle member A is provided with apertures 46 and 47 through which pass the conductors to the heating element 8.

In order to prevent the direct discharge of the incoming air against the heating element 8, a deflector plate 48 is secured by means of a screw 49 to the end wall 27 of the handle member and overlies the discharge end through the pipe section 26, being spaced therefrom to admit air to the heating chamber B, but at the same time deflect it away from directly flowing against the heating element 8.

Access to the interior of the section C of the handle, is made possible by means of a removable lid or cover 49 which is retained in position by means of screws 50 threaded into some convenient portion of the handle A.

The switch 38 is supported within the section C by means of lugs 51 which are formed at the time the handle member is made, and through which extend bolts or screws 52 in engagement with the switch.

The stop cock and the switch are shown in off position in the drawing, and the lever 33 is adjusted to admit minimum quantity of air into the heating chamber B.

When it is desired to utilize the blower of the present invention, an air hose 24 is connected to the pipe 17 by means of the clamp 18, and the extremity of the nozzle 13 inserted in a suitable aperture where it is desired to melt hardened grease, and the lever 36 is then moved to the right as viewed in Figure 2, against an abutment 53 formed by a recess 54 in the side wall of the section C of the handle A whereupon the stop cock is opened to admit air passage therethrough, and the lever 39 of the electric switch is snapped over to close the circuit to the heating element 8.

In view of the fact that the volume control member 31 is so adjusted as to admit some air to the heating chamber B while the current is flowing to the heating element 8 burning out of the heating element is prevented.

When it is desired to stop the operation of the blower, the lever is swung in the full line position of Figure 2 against the abutment 55 of the recess 54.

It will be observed that the blower of the present invention finds ready use in connection with melting grease in differential and transmission casings of automotive vehicles, as it may be hung in the drain openings of these casings and left there while the attendant goes about other business. Furthermore, the nozzle 13 such as illustrated in the drawing may be removed and other forms of nozzle employed or the nozzle may be removed and the discharge of hot air through nipple 11 may be utilized for thawing frozen radiators, water pumps, brakes, shackles, drains, locks and the like, and also for drying damp coils, spark plugs and distributor heads of automotive vehicles.

As a matter of fact, the invention finds ready use in many situations where it is desired to utilize a supply of hot air for a limited period of time in connection with the carrying out of certain desired efforts.

The provision of the volume control member 31 enables regulation of the air discharged through the nozzle 13, and also by reason of the variation of control of air supplied to the heating chamber B the temperature of the discharged air may be regulated to some extent.

It has been found in practice that the temperature of the air issuing from the nozzle of the blower of the present invention varies from 630° to 1,000° F. depending on the pressure of the air supplied to the heating chamber.

The provision of a single instrumentality for actuating the heat and air supply controls prevents burning out of the heating element and at the same time insures the operator that the heating supply has been discontinued, when the air supply has been stopped. This is an important feature of the present invention as it does make positive assurance of the discontinuance of the heat supply with the air supply, and the assurance that when the air supply is desired there is heat supply also.

In order to cool the switch box C, an air vent 56 is made in the pipe 17 to allow air to escape within the box while the blower is in use. This cooling of the box prevents damage to the switch.

The invention has been described herein more or less precisely as to details, yet it is to be understood that the invention is not to be limited thereby, since changes may be made in the arrangement and proportion of parts, and equivalents may be substituted, without departing from the spirit and scope of the invention.

The invention is claimed as follows:

1. A portable hot air blower, including in combination, a hollow handle and a heating chamber co-axially disposed, an air supply pipe passing through said handle and opening into said chamber, a heating element in said chamber, electric wires passing through said handle and connected to said heating element, an air control valve and electric switch disposed in said handle, a single control element such as a lever for simultaneously opening air passage and connecting said element in circuit or for shutting off air passage and cutting said element out of circuit, means for controlling the volume of air through said pipe, said means being adjustable within certain limits, and means for preventing stoppage of air when said last mentioned means is adjusted for minimum air supply.

2. A portable hot air blower including in combination, a hollow handle member and a heating chamber connected together, an air supply pipe passing through said hollow handle and communicating with said heating chamber, an electric heating element disposed within said chamber, electric conductors for said element passing through said hollow handle, a shutoff valve for the air pipe disposed within said handle, an electric switch for said conductors disposed within said handle, said shutoff valve having an oscillatable valve stem, said switch having a rocker arm for actuating it, a lever connected to said valve stem for oscillating it and also connected to said switch arm for rocking it, the operation of the lever in a direction to open said valve to admit air to said chamber causing swinging of said arm to close the electric circuit to said heating element and the operation of said lever to close the air valve to air passage causing the swinging of said arm to open the circuit of said heating element.

ADAM A. BREUER.